(12) United States Patent
Kerr et al.

(10) Patent No.: US 7,349,627 B2
(45) Date of Patent: Mar. 25, 2008

(54) TRACKING AN IMAGE-RECORDING MEDIUM USING A WATERMARK AND ASSOCIATED MEMORY

(75) Inventors: Roger S. Kerr, Brockport, NY (US); Timothy J. Tredwell, Fairport, NY (US); Christopher L. DuMont, Rochester, NY (US); Diane M. Carroll-Yacoby, Honeoye Falls, NY (US); Paul W. Jones, Churchville, NY (US); Peter M. Stwertka, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1083 days.

(21) Appl. No.: 10/662,220

(22) Filed: Sep. 12, 2003

(65) Prior Publication Data

US 2005/0086480 A1  Apr. 21, 2005

(51) Int. Cl.
*G03B 17/24* (2006.01)
*G03B 29/00* (2006.01)

(52) U.S. Cl. .................... 396/310; 396/429; 352/78 C; 352/92

(58) Field of Classification Search ................ 396/310, 396/311, 429; 352/78 R, 78 C, 92
See application file for complete search history.

(56) References Cited

U.S. PATENT DOCUMENTS

| | | |
|---|---|---|
| 3,835,301 A | 9/1974 | Barney |
| 4,075,018 A | 2/1978 | Custer |
| 5,266,968 A | 11/1993 | Stephenson |
| 5,528,222 A | 6/1996 | Moskowitz et al. |
| 5,850,481 A | 12/1998 | Rhoads |
| 5,875,249 A | 2/1999 | Mintzer et al. |
| 5,912,972 A | 6/1999 | Barton |
| 5,949,885 A | 9/1999 | Leighton |
| 6,005,940 A | 12/1999 | Kulinets et al. |
| 6,031,914 A | 2/2000 | Tewfik et al. |
| 6,044,156 A | 3/2000 | Honsinger et al. |
| 6,106,166 A * | 8/2000 | Spurr et al. ................. 396/578 |
| 6,173,117 B1 * | 1/2001 | Clubb ........................ 392/442 |

(Continued)

FOREIGN PATENT DOCUMENTS

EP   1 081 540   9/2004

OTHER PUBLICATIONS

TK5550, Temic Semiconductors, Read/Write Transponder, Rev.A1, Apr. 30, 1997.
e5550, Temic Semiconductors, Standard Read/Write Identification IC, Rev.A3, Mar. 17, 1998.

(Continued)

*Primary Examiner*—W. B. Perkey
(74) *Attorney, Agent, or Firm*—Roland R. Schindler

(57) ABSTRACT

A method for tracking a segment of an image-recording medium and an image-recording medium are provided. In a first aspect of the invention what is provided is a method for distributing an image-recording medium. In accordance with the method, an identifying mark is encoded within a recorded image area on the image-recording medium. A tracking memory is associated with the image-recording medium with the tracking memory having information stored therein. The image-recording medium is distributed to users of the image-recording medium and tracking information from the tracking memory is read and stored in a database that associates the users to whom the image-recording medium has been distributed with the identifying mark recorded in the image area.

41 Claims, 7 Drawing Sheets

U.S. PATENT DOCUMENTS

| | | | |
|---|---|---|---|
| 6,232,870 B1 * | 5/2001 | Garber et al. ............... | 340/10.1 |
| 6,247,857 B1 * | 6/2001 | Wheeler et al. ............ | 396/567 |
| 6,353,672 B1 | 3/2002 | Rhoads | |
| 6,381,416 B2 * | 4/2002 | Manico et al. .............. | 396/207 |
| 6,824,320 B1 * | 11/2004 | Kerr et al. .................. | 396/512 |
| 6,930,759 B2 * | 8/2005 | Roddy et al. ................ | 355/67 |
| 2003/0012569 A1 * | 1/2003 | Lowe et al. ................. | 396/310 |
| 2003/0025027 A1 * | 2/2003 | Ebisawa et al. ......... | 242/525.4 |
| 2003/0138127 A1 | 7/2003 | Miller et al. | |

OTHER PUBLICATIONS

HID Corp., Multi-Technology Card Guide, date unknown.

Atmel Smard Card ICs, Silicon Solution Making Smart Cards Smarter, date unknown.

Atmel Read-Only Transponder, TK5530, Rev.A5, Dec. 19, 2001.

Philips Semiconductors, mifare Standard Card IC, MF1 IC S50 Functional Specification, Revision 5.1, date unknown.

Texas Instruments, Radio Frequency Identificatin Systems, Tag-It, Moving Concepts to Reality, date unknown.

Tiris Technology by Texas Instruments, Making RFID work for you, Open Forum, date unknown.

The Cutting Edge of RFID Technology and Applications for Manufacturing and Distribution by Sysy d'Hont, Texas Instrument TIRIS, date unknown.

White Paper—doc center, Latest Generation Technology for Immobilizer Systems, Dipl-Ing. Michael Knebelkamp, Dipl-Ing. Herbert Meier, Freising, date unknown.

* cited by examiner

TRACKING AN IMAGE-RECORDING MEDIUM USING A WATERMARK AND ASSOCIATED MEMORY

FIELD OF THE INVENTION

The present invention relates, in general, to image-recording media and more specifically to methods and apparatuses for tracking the processing and use of a segment of an image-recording medium.

BACKGROUND OF THE INVENTION

Motion picture piracy is a cause of substantial revenue loss to the motion picture industry. Illegally copied motion pictures can be a significant contributing factor to revenue loss for motion picture studios. Such illegal copies of a motion picture are typically made using a sophisticated telecine apparatus or filmed during projection using a video camera. Even the questionable quality of motion pictures pirated in this fashion does not prevent them from broad distribution in the "black market", especially in some overseas markets, and on the Internet. As video cameras improve in imaging quality and become smaller and more capable, the threat of illegal copying activity becomes more menacing to motion picture providers. While it may not be possible to completely eliminate theft by copying, it can be advantageous to provide forensic techniques that help to pinpoint where an illegal copy of a motion picture was made, whether obtained using a video camera device or copied directly from a print film using a telecine or other scanning apparatus.

It is known to provide a distinct symbol or watermark to an original still image as a means of image or copy identification, such as in order to authenticate a copy. As examples, U.S. Pat. No. 5,875,249 entitled "Invisible Image Watermark For Image Verification filed by Mintzer et al. on Jan. 8, 1997; U.S. Pat. No. 6,031,914 entitled Method and Apparatus Embedding Data, Including Watermarks, In Human Perceptible Images, filed by Tewfik et al. on Aug. 27, 1997; U.S. Pat. No. 5,912,972 entitled Method and Apparatus For Embedded Authentication Information Within Digital Data filed by Barton on Jun. 15, 1999; and U.S. Pat. No. 5,949,885 entitled Method For Protecting Content Using Watermarking filed by Leighton on Aug. 29, 1997, disclose methods of applying a perceptually invisible watermark to image data as verification of authorship or ownership or as evidence that an image has not been altered. Advanced steganographic or "hidden content" techniques used for embedding watermarks and other information content within images are also disclosed in commonly assigned U.S. Pat. No. 6,044,156 entitled Method for Generating An Improved Carrier For Use In An Image Data Embedding Application, filed by Honsinger et al. on Apr. 28, 1997; U.S. Pat. No. 5,850,481, entitled Steganographic System filed by Rhoads on May 8, 1995; and U.S. Pat. No. 6,353,672 entitled Steganographic Using Dynamic Codes filed by Rhoads on Mar. 8, 2000. Embedded watermarks formed using such techniques, can provide various types of encoded message information, for example, a string of bits.

Watermarking schemes, such as those disclosed in the patents listed above, can be employed to add an identifying watermark within the recorded image area of each copy of a motion picture. Proper deployment of such techniques can provide a watermark encoding that is imperceptible to the viewer's eye but can be detected when analyzing a pirated copy of a motion picture. Such watermarks are typically made to be robust, that is, able to withstand various "attacks" that can remove or alter the watermark.

To provide accurate tracking of a motion picture watermark, it is necessary to uniquely identify the distribution path of the print. In fact, for even better precision, there can be advantages in providing multiple watermarks in a single copy of a motion picture, so that each copy of a motion picture contains at least one individual length or segment of film having a unique, trackable watermark. In this way, even an individual segment of film of an illegally copied motion picture could be analyzed, its watermark detected, and its processing and distribution history tracked with precision. In order to provide this type of tracking capability, the processing and distribution history for each copy of a motion picture and/or a segment of film must be stored in some accessible fashion, such as in a database, and the watermark must be coupled, that is, associated in some way, to the specific stored information about a segment of film or motion picture. This type of tracking can be used, for example, to provide forensic data and evidence that can be used to identify and prosecute those making an illegal copy of a motion picture.

In order to appreciate the difficulty involved in tracking the many copies of a motion picture, it is instructive to understand the conventional process by which a motion picture is manufactured, processed, and provided to a theater or other exhibitor. Referring to FIG. 1, there is shown an overview of the prior art process for producing and distributing a motion picture. A media manufacturer 20 initially manufactures film stock known as print film in the form of a large web of un-imaged print film. The web of un-imaged print film is then slit to produce multiple strips of un-imaged print film 22 which are then wrapped about core 24 to produce multiple rolls 26 of un-imaged print film 22. Such un-imaged print film rolls 26 are typically 6000 feet in length; however, they can be any other convenient length. As un-imaged print film 22 is fabricated by media manufacturer 20 information may be exposed onto the un-imaged print film 22 such as product code, strip number, roll and part number, date or other information. This information is typically exposed on an edge of un-imaged print film 22, outside of an area of un-imaged print film 22 that is to receive scene content. Such information is not accessible until after the un-image print film 22 is processed by film processor 50.

When a studio 30 releases a motion picture for distribution, a master copy 32 of the motion picture is provided to a printing lab 34. At printing lab 34, a printing apparatus 36, such as a contact printer, is used to imprint an image of master copy 32 onto one or more rolls 26 of un-imaged print film 22. Printing apparatus 36 has an exposure head 38 that exposes images from master copy 32 onto un-imaged print film 22 to form an exposed print film 46 that is wound to form an imaged print film reel 48. Master copy 32 may be fed in a continuous loop or fed from a source reel 42 to a take-up reel 44.

Imaged print film reel 48 is taken from printing apparatus 36 and provided to film processor 50 for development using a conventional chemical process that routes exposed print film 46 through a sequence of baths 52 such as a developer bath 52a, a bleach bath 52b, and a fixer bath 52c. After this process, exposed print film 46 is dried to become a developed print film 54. Alternatively, exposed print film 46 can be processed in other ways such as using thermal processing methods to form developed print film 54. Developed print film 54 is then packaged, for example, by mounting developed print film 54 on reel cores 56, becoming film reels 58 having a typical length of 2000 feet. Typically a motion picture is made up of six to eight film reels 58 that vary in length. However, the number and length of film reels 58 used for a feature film can vary depending on the length of the motion picture.

Film reels 58 are then sent to a distributor 64, also known as a film exchange, who adds reel sides 60 that snap into reel cores 56 to provide protection and integrity to the developed print film 54. Reel sides 60 can alternatively be added at printing lab 34. Film exchange 64 assembles the appropriate film reels 58 to form a package comprising the entire motion picture for distribution to exhibitors 66. Exhibitors 66 typically provide the necessary splicing or handling required to combine the provided reels to display the motion picture.

It must be observed that the sequence shown in FIG. 1 is deliberately simplified for the sake of description and allows a number of variations in actual practice, but should be adequate for an overall understanding of key processes from film manufacture through distribution. Film packaging, for example, may be varied, depending on whether cores 24, reel cores 56, or other support structures are most appropriate. Processes illustrated at printing lab 34 such as printing and developing can all be performed at one location or performed at different locations. The roles of printing lab 34, developer 50 and film exchange 64 can overlap or be combined in many different ways than described or shown in FIG. 1.

With respect to FIG. 1, it can be seen that it is possible to use a watermark to uniquely identify each developed print film 54 in a way that the watermark can be extracted from an illegal copy of a motion picture recorded on the developed print film 54. However, to use such a watermark to identify the origin of illegal copies, the distribution path of the developed print film 54 bearing the watermark must be known. This requires each developed print film 54 be tracked throughout its subsequent processing and distribution. However, as is shown in FIG. 1, the complexity of the film printing, developing and distribution process presents significant traceability challenges. What is needed is a method and system that are capable of building an association between a detected watermark and tracking of distribution information for that motion picture. What is also needed is a method and system that are capable of accurately maintaining and updating tracking information for each motion picture throughout each stage of film processing and distribution. Such a method and system should be relatively inexpensive, require little labor, and be unobtrusive and difficult to circumvent.

It will be appreciated that there is some capability, using conventional edge-coding techniques that expose information outside the image area, to provide an identifier that can only be used for identification after un-imaged print film 22 moves through exposure and development, but this would be inconvenient and obtrusive during distribution due to packaging. Therefore there is no ready access to the edge coded information.

Thus, what is needed are methods and systems for tracking the movement of watermarked film that are conveniently applied at all stages of producing and distributing a motion picture.

SUMMARY OF THE INVENTION

In a first aspect of the invention what is provided is a method for distributing an image-recording medium. In accordance with the method, an identifying mark is encoded within a recorded image area on the image-recording medium. A tracking memory is associated with the image-recording medium with the tracking memory having information stored therein. The image-recording medium is distributed to users of the image-recording medium and tracking information from the tracking memory is read and stored in a database that associates the users to whom the image-recording medium has been distributed with the identifying mark recorded in the image area.

In another aspect of the invention, a method for distributing an image-recording medium is provided. In accordance with this method, an identifying mark is encoded onto an image-bearing segment of imaged recording medium to form a marked image-recording medium and the marked recording medium is stored using a first packaging having a first memory. Tracking data is stored in the first memory from which the identifying mark on the image bearing segment of the image bearing medium can be identified. An image is recorded onto the marked image-recording medium to form an imaged recording medium, and the marked image-recording medium is stored using a second packaging having a second memory. Tracking data is read from the first memory, and information is stored in the second memory from which the markings on the imaged recording medium can be used to determine information about the distribution of the imaged recording medium.

In yet another embodiment of the invention, a method is provided for tracing the source of an illegal copy of motion picture. In accordance with this method, the identifying mark is encoded onto a segment of an image-recording medium to form a marked segment of said image-recording medium with said identifying mark associated with the data location in a memory, with said memory coupled to said marked segment of said image-recording medium, and with said data location comprising data identifying said marked segment.

In yet another embodiment of the invention, an image-recording is provided. The medium has a segment of an image receiving surface having an identifying mark encoded thereon and a tracking memory coupled to the medium, said memory having data stored thereon corresponding to said identifying mark.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, an apparatus in accordance with the invention. It is to be understood that elements not specifically shown or described may take various forms well known to those skilled in the art.

While one embodiment of the present invention is directed to photographic film media processing and tracking, the method of the present invention could be used with image-recording media in general, such as with magnetic or optically encoded media, for example.

Processing Adaptations for Watermark Tracking

Figure 1:
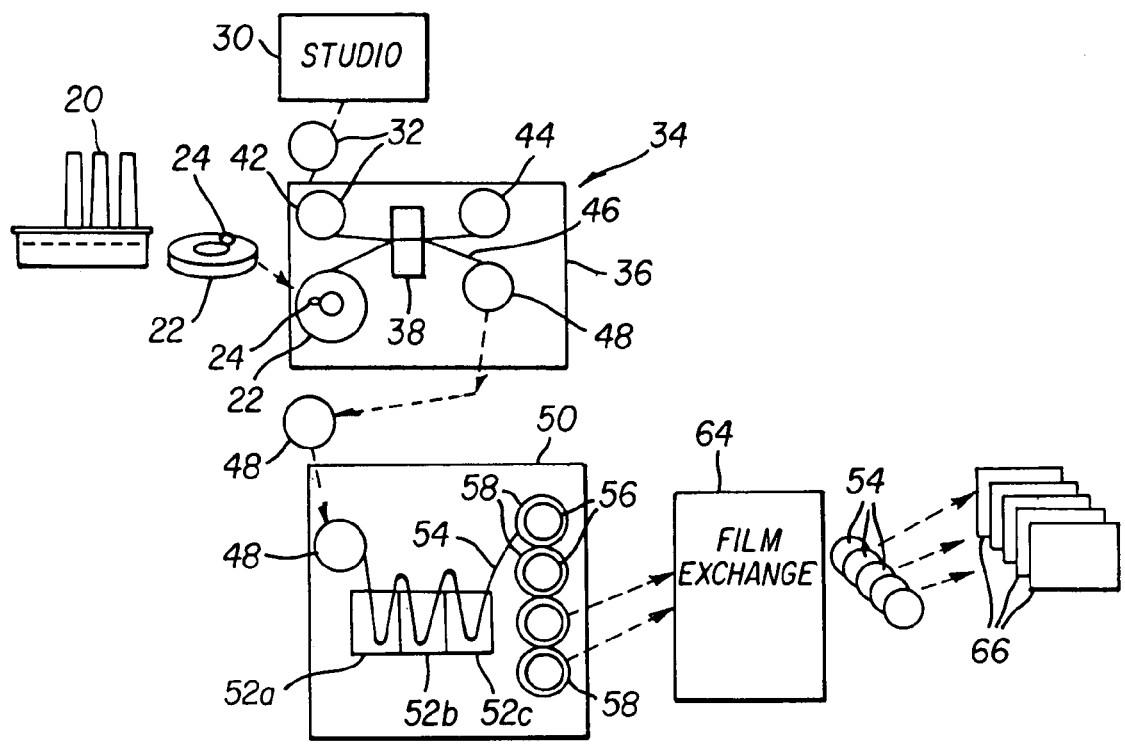
FIG. 1 is an overview block diagram showing the prior art sequence for film processing and distribution, following manufacture.
Figure 2:
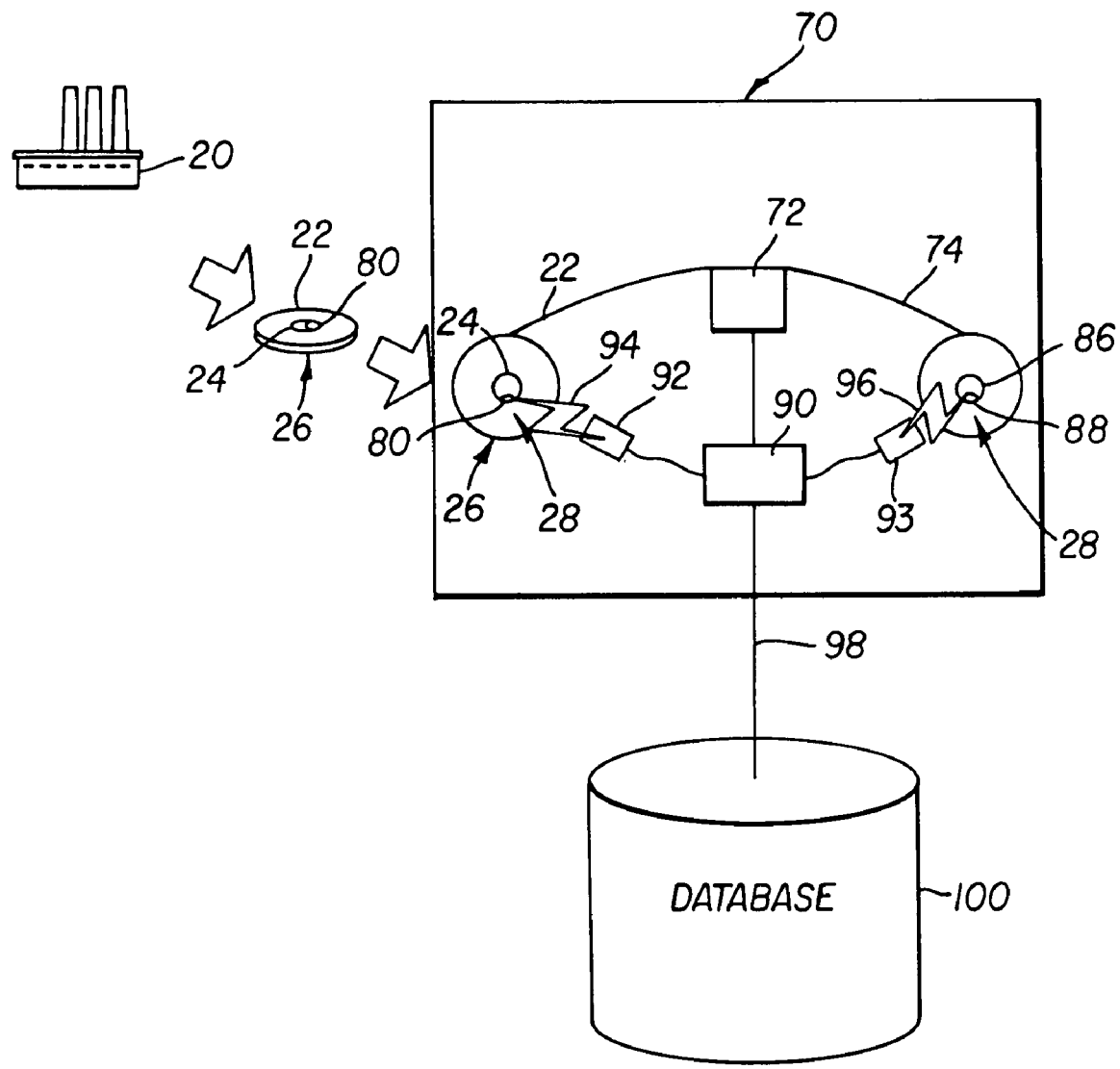
FIG. 2 is a block diagram showing processing of film in a latent image printer according to the present invention.

Referring now to FIG. 2, there is shown a processing procedure added to the conventional processing of FIG. 1 for print film processing and distribution according to one embodiment of the present invention. Un-imaged print film 22, having an image-recording area to receive images, and as described above, un-imaged print film material 22 can also include some latent markings outside the image area, such as a barcode, human-readable alphanumeric code, or other encoding. Media manufacturer 20 typically winds un-imaged print film 22 on core 24 to form an un-imaged print film roll 26. As is shown in FIG. 2, un-imaged print film roll 26 is loaded into a marking printer 70 that uses a watermarking exposure device 72 to form a watermark (not shown) on un-imaged print film 22 in order to produce a watermarked print film 74. The watermark can be any of a number of types of imperceptible image watermarks known in the steganographic arts, such as those that represent a number or alphanumeric sequence or a bit pattern, for example. Alternatively, the watermark can also be recorded in a perceptible but unobtrusive manner.

Watermark exposure device 72 can use any of a number of marking technologies for forming a watermark on un-imaged print film 22 to form watermarked print film 74. For example, watermarking exposure device 72 can form a watermark using exposure radiation, which can be used to form a latent image. Alternately, watermark exposure device 72 can form a watermark by applying a colorant such as ink or dye, punching holes in the un-imaged print film 22, embossing un-imaged print film 22, or using other techniques to form a watermark on un-imaged print film 22. In the embodiment shown in FIG. 2, the watermark is formed prior to printing scene content. However, in alternative embodiments, a watermark could alternately be applied at other points in the processing sequence. For example, media manufacturer 20 could use a colorant or other techniques to form a watermark prior to wrapping onto core 24 in print film fabrication, as subsequently described.

Figure 3:
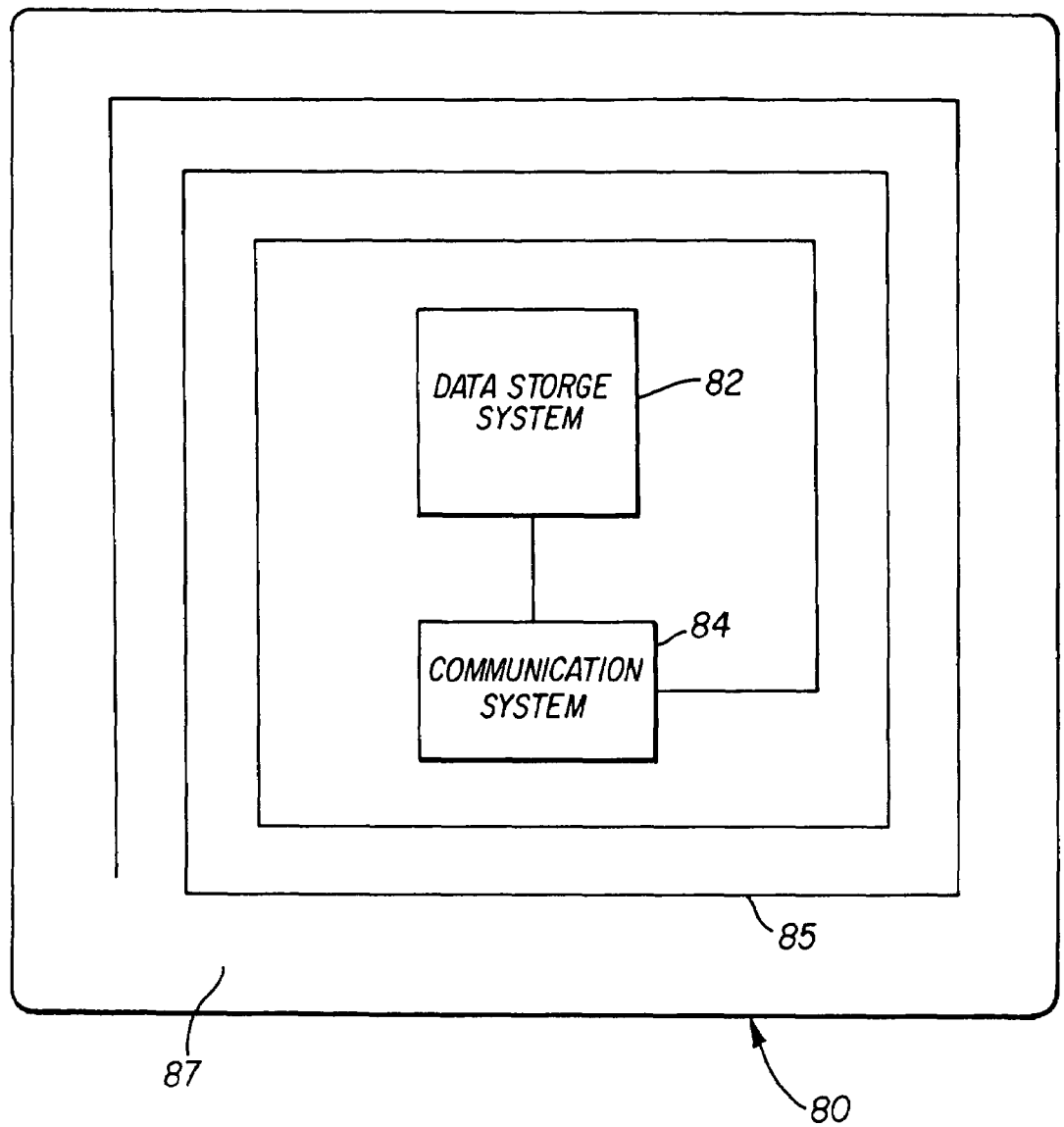
FIG. 3 is a plan view of one embodiment of a tracking memory.

Tracking information such as information about the watermark encoded on watermarked print film 74 is stored in a tracking memory 28. FIGS. 2 and 3 show a diagram of one embodiment of a tracking memory 28, shown as memory 80. In the embodiment shown in FIGS. 2 and 3, memory 80 comprises a data storage system 82 and a communication system 84 having an antenna 85 stored on a substrate 87 having an adhesive thereon for joining memory 80 to a film, reel or core. Communication system 84 enables electronic data to be exchanged with data storage system 82.

In the embodiment shown in FIGS. 2 and 3, communication system 84 includes a radio frequency transponder that is capable of receiving a first electromagnetic signal and generating a second electromagnetic signal in response with data being exchanged by way of the first and second electromagnetic signals. One example of memory 80 having a data storage system 82 and a radio frequency type communication system 84 is a Radio Frequency Identification (RFID) tag. RF ID tags have been proposed for use in a wide range of identification and tracking applications, such as with passports and credit cards, as is disclosed in U.S. Pat. No. 5,528,222 to Moskowitz et al. One type of commercially available, low profile RF ID tag is the "TAG-IT INLAY"™ RFID tag available from Texas Instruments, Incorporated, located in Dallas, Tex., USA. This component can be used to provide identifying information about an item to which it is attached, for example. RF ID devices are useful for tracking the location, characteristics and usage of documents, books, packages, and other inventory. For example, RF ID tags can be used to track the location of documents and track the chain of custody of such documents within a document management system. RF ID tags offer the advantage of small size, enabling these devices to be unobtrusively attached or hidden within an item. RF ID tags allow communication regardless of orientation relative to the transceiver, and can communicate through product packaging so that the data stored in an RFID device can be accessed during distribution of product. Equipped with an on-board read-write memory, these devices can be used for recording and recall of at least some amount of data, which can be related to an item to which they are coupled.

Other examples of RF type tracking memories 28 include "SAMPT" (Selective Addressable Multi-Page Transponder), part number "RI-TRP-IR2B" available from Texas Instruments, Incorporated, a "Model TL5550" transponder, available from Vishay-Telefunken Semiconductors, Incorporated. Low-profile transponder devices, particularly devices having an integral antenna, offer special advantages in this application.

Tracking memory 28 such as memory 80 is physically coupled to un-imaged print film 22 at the time of manufacture by media manufacturer 20, such as by insertion into or adhesion onto to core 24 or by affixing memory 80 to other packaging (not shown) used for un-imaged print film 22. Memory 80 can alternatively be embedded into un-imaged print film 22. As used herein, the term physically coupled can include any type of attachment of a tracking memory 28 with a corresponding film. A "logical coupling" also provided related to the physical coupling of at least one tracking memory 28 such as memory 80 with a film. The logical coupling effectively links data in tracking memory 28, such as in database system 100 described above, with a corresponding film. Using the methods of the present invention, each film can be logically coupled to tracking memory 28 throughout film processing and distribution.

Tracking memory 28 can also be provided using other types of devices such as bar coded labels, magnetic memory devices and other solid state devices similarly coupled to un-imaged print film 22, for directly storing encoded data or for storing auxiliary information that can be read, used and stored during processing and distribution.

The processing sequence shown in FIG. 2 moves from left to right. As shown, an un-imaged print film 22 on core 24 with its coupled memory 80 is fed through watermark exposure device 72 to expose watermark 68 on un-imaged print film 22. Watermarked print film 74 is then wound onto a second core 86, containing a second memory 88. A control logic unit 90 controls one or more RF transceivers shown in this embodiment as RF transceivers 92 and 93 for read/write interaction with memory 80 and a second memory 88 using RF signals 94 and 96. Examples of transceivers that can be used for one or more of RF transceivers 92 and 93 include "Model S2000" transceivers, available from Texas Instruments, Incorporated, located in Dallas, Tex., USA and "Model U2270B" transceivers, available from Vishay-Telefunken Semiconductors, Incorporated, located in Malvern, Pa., USA can also be used.

In operation, transceivers 92 and 93 transmit an RF signal comprising a first electromagnetic field of a first predetermined frequency. RF transceivers 92 and 93 are also capable of receiving a second electromagnetic field of a second predetermined frequency from a transponder such as memory 80. The same frequency can also serve for both first and second electromagnetic fields.

Control logic unit 90 controls the operation of watermark exposure device 72 and causes at least one watermark 68 to be recorded onto un-imaged print film 22. Optionally, control logic unit 90 can cause multiple watermarks to be recorded on un-imaged print film 22. This can be used, for example, to record a different watermark on separate segments of un-imaged print film 22. Media manufacturer 20 can encode film information on memory 80 such as exposure information. This information can be read by transceiver 92 and used by control logic unit 90 to adjust the watermarked recording process and/or for other purposes. The watermark or combinations of watermarks that are recorded on watermarked print film 74 are intended to uniquely identify each film reel 86 of watermarked print film 74. However, to provide the tractability necessary for anti-piracy, it is necessary to determine which copy of a motion picture is recorded on watermarked print film 74 that was used to make an unauthorized copy of the motion picture. Thus, it is necessary to maintain a record of each entity that processes, distributes and exhibits a motion picture recorded on watermarked print film 74.

Accordingly, control logic unit 90 stores tracking data that associates the watermark or combination of watermarks recorded on watermarked print film 74 with the particular copy of the watermarked print film 74 itself. As used herein, the term tracking data is used to describe any information recorded in association with watermarked print film 74 that can be used to traceably separate one watermarked print film 74 from other watermarked print films 74 that are used to produce other copies of the same motion picture during the processing and distribution process. In the embodiment shown in FIG. 2, the tracking data is associated with watermarked print film 74 using a second memory 88 such as the RFID type memory described above that is located on second core 86. As is shown in FIG. 2, watermarked print film 74 is stored on second core 86, and watermarked print film 74 is moved from marking printer 70 while still wound on second core 86. Accordingly, the tracking data stored in second memory 88 travels with watermarked print film 74.

The tracking data can comprise a film print identification such as a film identification number that can be used to traceably separate one watermarked print film 74 from another. Control logic unit 90 stores data in a database system 100 associating each watermark recorded on watermarked print film 74 with the film identification number of a particular watermarked print film 74.

Control logic unit 90 can also cooperate with transceiver 92 and/or 93, memory 80 and/or second memory 88 to perform steps such as:

(a) reading data, if any, from memory 80 that is coupled to un-imaged print film 22;
(b) processing the data received from memory 80;
(c) generating additional data;
(d) writing the read data, processed data and/or additional data to second memory 88.

As a result of these steps, the film identifier and optionally some or all of the data from memory 80 and/or other data generated during the watermarking process is transferred to second memory 88. An optional network connection 98 provides communication between control logic unit 90 and database system 100 for storing tracking data that links the watermark or combination of watermarks recorded on watermarked print film 74 with the film. Using the data stored in database system 100, it becomes possible to use a watermark detected in a copy of a watermarked film print 134 to determine how the watermarked film print 134 was processed and distributed.

For the purposes of the present invention, memory 80 is optional until the watermark is applied. That is, there may be no advantage to tracking an un-imaged print film 22 not yet bearing watermark 68 in some applications. However, once the watermark is exposed or otherwise applied to form a watermarked print film 74, second memory 80, or an equivalent mechanism providing second memory 80 and thereby linking second memory 80 contents with watermark on watermarked print film 74, is used for processing and distribution tracking.

Figure 4:
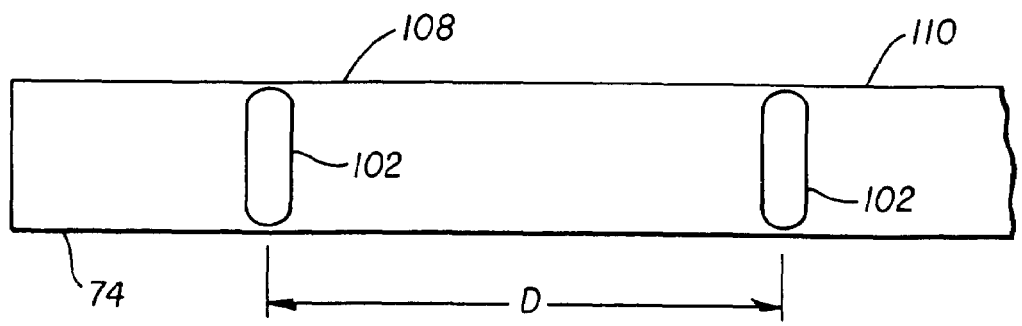
FIG. 4 is a plan view showing a film media segment processed according to the present invention.

Referring to FIG. 4, there is shown a plan view of watermarked print film 74 having two watermarks 102 and 104, spaced apart by a distance D. With this arrangement, each watermark 102 and 104 is associated with a corresponding one of media segments 108 and media segment 110, respectively. As noted above, there are numerous different possible watermark arrangements including the use of multiple watermarks within the same media segment 110 or other media segments. For example, multiple occurrences of a watermark such as watermark 102 can be incorporated within a media segment such as media segment 110 to help provide easier detection. Optionally, multiple different watermarks can be recorded on each media segment. For example, each such different watermark can be recorded using a different watermarking technique. Media segments 108 and 110 can be any desired length, as best suits the need for accuracy and detection. In one embodiment, for example, a typical watermarked print film 74 provided to an exhibitor 66 can comprise more than 20 successive media segments 108 and 110. Watermarks such as watermark 102 and watermark 104 could be formed onto media segments such as media segment 108 and media segment 110 using any suitable spatial arrangement, orientation, rotation, or separation distance. For example, watermarks 102 and 104 can be spaced regularly or spaced at uneven intervals, or could even be contiguous. Further, in certain embodiments, watermarks such as watermark 102 and 104 can be recorded on watermarked print film 74, in a combined fashion such as by overlapping or interleaving watermarks 102 and 104 in adjacent media segments 108 and 110.

Figure 5:
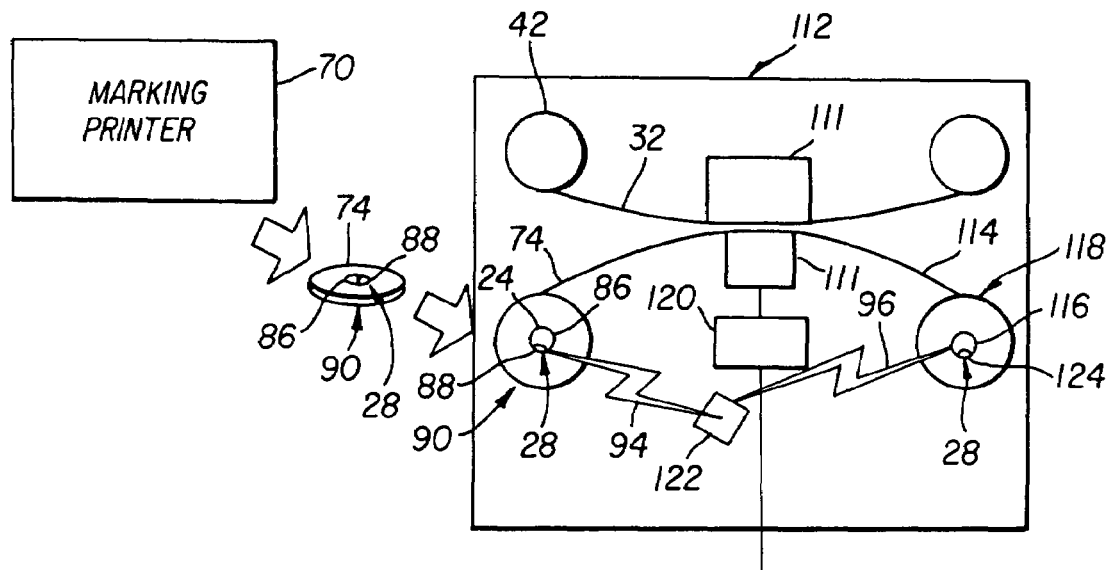
FIG. 5 is a block diagram showing a printer adapted for watermark tracking according to the present invention.

Referring to FIG. 5, there is shown a process for printing watermarked print film 74 using a printing apparatus 112. In a similar sequence to that described earlier with reference to printing onto un-imaged print film 22 in FIG. 1, watermarked film 74 in FIG. 5 is exposed by printing head 111 to images on master copy 32 which is provided by studio 30, to form an exposed marked film 114. Exposed marked film 114 is then stored on exposed film core 116 to form exposed film roll 118.

A printer control logic unit 120 uses a printer transceiver 122 to use RF signal 94 to read data from second memory 88 coupled to second core 86 on which marked print film 74 is stored. Printer control logic unit 120 also performs any desired processing on that data, and causes printer transceiver 122 to write data using RF signal 96 to an exposed film memory 124, which in this embodiment comprises an RFID transponder that is coupled to an exposed film core 116 on which exposed marked film 114 is stored. Printer control logic unit 120 determines the print identifier for the watermarked print film 74 on second core 86 and causes this information to be stored in database system 100. For example, printer control logic unit 120 can use a network connection 128 to provide communication between printer control logic unit 120 and database system 100. In this embodiment, database system 100 records printing data in association with the film identifier for watermarked print film 74 indicating that the watermarked print film 74 has been used in a printing operation by printing apparatus 112. The printing data includes at least sufficient information so that the watermark can be used to identify printing lab 34 or printing apparatus 112 used to print on unexposed film 74. Printer control logic unit 120 can record other data received from second memory 88 in database system 110. Further, where second memory 88 contains information that is useful in printing an image of master copy 32 onto watermarked film 74, printer control logic unit 120 receives and uses such information to improve upon the printing process.

Figure 6:
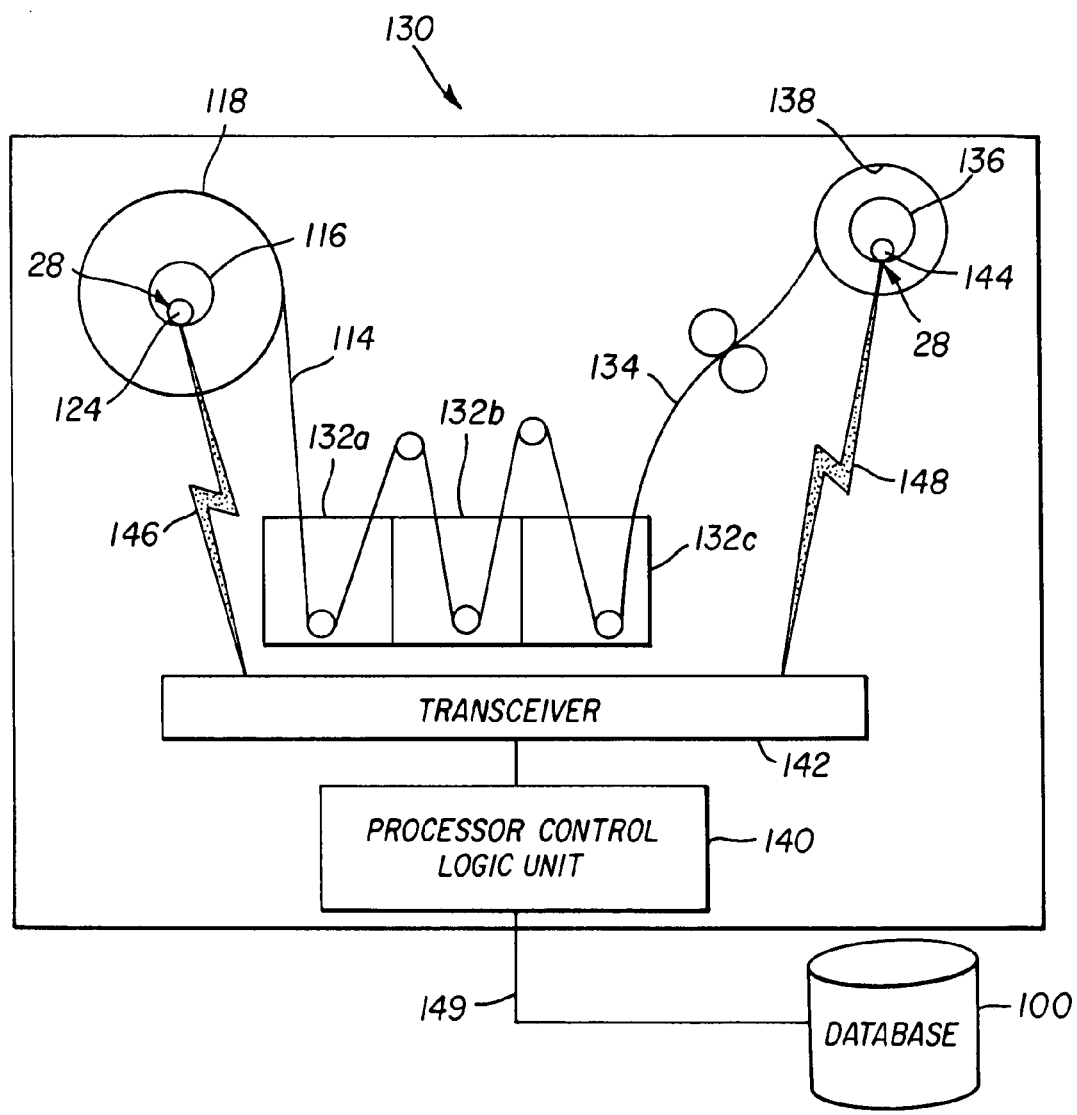
FIG. 6 is a block diagram showing a film processor adapted for watermark tracking according to the present invention.

Referring to FIG. 6, there is shown a processor 130 that develops exposed marked film 114 to provide a developed film print 134. Generally speaking, processor 130 develops exposed marked film 114 in the same manner that was described above with respect to film processor 50, with exposed marked film 114 being passed through various baths such as a developer bath 132*a*, bleach bath 132*b*, and fixer baths 132*c*, and after these baths a developed film print 134 is dried. Other conventional processes can also be performed by processor 130. Further, other types of image-recording media can be otherwise chemically or thermally processed or may not need any type of processing. After any processing, developed film print 134 can be provided on distribution cores 136 optionally, for subsequent assembly into one or more reels 138.

Processor 130 has a control logic unit 140 for ensuring that the tracking data follows the exposed marked film 114 through the development process. In this regard, control logic unit 140 operates a transceiver 142 that communicates with exposed film memory 124 by way of RF signals 146. Data including film identification data is read from exposed film memory 124 using developer transceiver 142, processed by processor control logic unit 140, and updated data is written to distribution memory 144 by a transceiver which in this embodiment comprises an RFID and is located on distribution core 136, or optionally, on distribution reel 138.

Optionally, processor control logic unit 140 can be adapted to adjust the processing of exposed marked film 114 in accordance with other data that is stored in exposed film memory 124, or that can be obtained from database 100. Processor network connection 149 provides communication between processor control logic unit 140 and database system 100.

Figure 7:
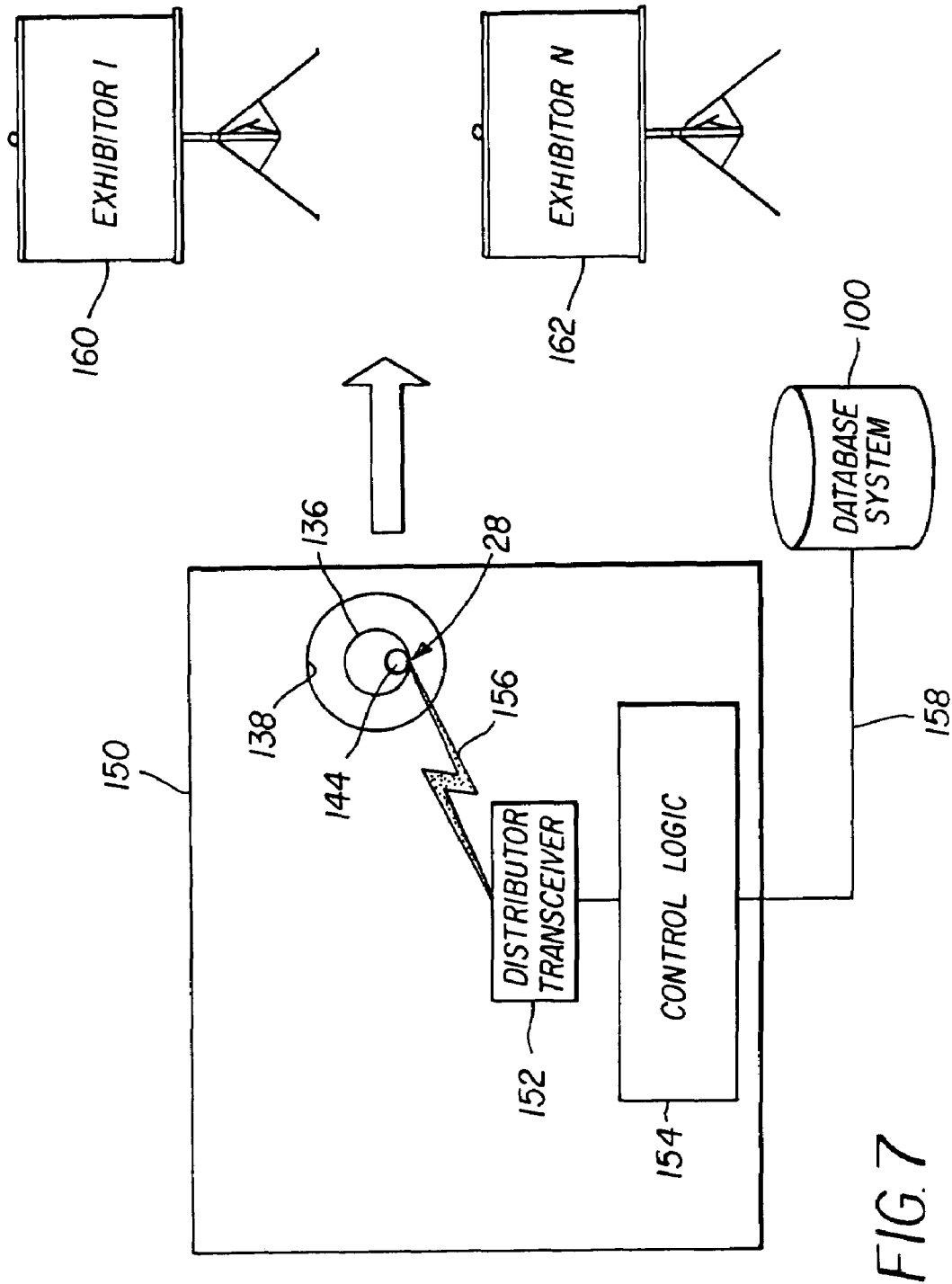
FIG. 7 is a block diagram showing the apparatus used for watermark tracking at a film distributor.

Referring to FIG. 7, there is shown the tracking process provided by film exchange distributor 150 prior to shipping distribution cores 136 or optionally distribution reel 138, having film print 134 to exhibitors 160. Here, control logic unit 154 operates a distributor transceiver 152 to obtain data from distribution memory 144 using RF signals 156. Network connection 158 provides communication between control logic unit 154 and database system 100. Control logic unit 154 causes information obtained from distribution memory 144 plus any desired distribution information to be conveyed to database system 100 using this connection. Examples of this distribution data include, but are not limited to, shipping date, time, destination and delivery information database system 100 and for storing data obtained from this process.

Once the process shown in FIG. 7 is completed, sufficient information is available in database system 100 to track a specific distribution reel 138 by associating the detected watermark with a specific distribution reel 138 provided to specific exhibitors 160 and 162 by a specific film exchange distributor or other distributor 150, for example.

As FIGS. 2 and 4-7 illustrate, some type of tracking memory 28 is employed at key stages in media processing, to associate a watermark formed on an image-recording medium, such as a film, with tracking information in tracking memory 28. Tracking memory 28 itself can comprise tracking information such as information encoded in a bar code 170 label as will be described in greater detail below with reference to FIG. 8. Alternatively, tracking memory 28 can store tracking information encoded in memory circuitry of a read/write RF transponder or other memory device as described above. In such a case, tracking memory 28 is coupled directly to the image-recording medium by virtue of attachment of such bar code, RF transponder or coupling of some other memory device. Alternately, the tracking data can be stored in database system 100, so that an attached encoding, such as a bar code or a RF transponder, provides linkage or addressing information that couples the image-recording medium to tracking data in tracking memory 28. Other types of semi-conductor or other electronic memory devices can also be used for tracking memory 28.

It must be observed that alternative devices or encodings could be employed at different stages in media processing. Thus, for example, tracking memory 28, associated with un-imaged print film 22, can comprise a bar code 170, with the bar code 170 containing tracking information and/or other information. An RF transponder could then be provided at some later stage than is shown in the sequence of FIGS. 2 and 4-7, such as for watermarked print film 74 (FIG. 2) or for film print 134 (FIG. 6 or 7). In one alternative arrangement, the process at marking printer 70 of FIG. 2 would require reading bar code 170 for un-imaged print film 22 and writing information onto a memory such as second memory 88 for watermarked print film 74. Similar alternative arrangements that switch from one type of device to another could be used wherever processing of image-recording media requires accessing data to and from tracking memory 28.

Options for Watermark Printing

In the embodiment shown in FIGS. 2, 4, 6, and 7, watermarks such as watermarks 102 and 104 can be imprinted onto un-imaged print film 22, as is described with particular reference to FIG. 2. This may be the preferred arrangement where media manufacturer 20 applies a watermark, for example, since subsequent film processing may be handled by other vendors who operate outside the sphere of control of media manufacturer 20. However, it may also be desirable to expose watermarks using printing apparatus 112. In such a case, watermark 102 can be exposed either before or after exposure of the film image at printing apparatus 112. The alternative of providing watermark 202 as part of a later processing phase may offer benefits for distributors 64, for example, who have an interest in tracking all copies made from one master copy 40.

Tracking Data

In the embodiment shown in FIGS. 2, 4, 5, 6, and 7, tracking memory 28 has been described as comprising memories such as memory 80, second memory 88, exposed film memory 124 and distribution memory 144. In one embodiment each of memories 80, 88, 124 and 144 have RF transponders that have some amount of on-board memory storage capability, sufficient to allow the capability to associate each individual film with its corresponding reel 46 or core 38. Additional information, such as date/time stamps, vendor data for printing and processing functions, master data identifier, sound negative identifier, printer identifier, and other encoded data could also be stored using these memory type tracking memories 28. Such information is transferred during processing from one tracking memory 28, such as any one of memories 80, 88, 124, 144 to another tracking memory 28.

For example, Table I shows a possible flow of information where tracking memory 28 is capable of storing data.

| | Data stored In Tracking Memory | | | | |
|---|---|---|---|---|---|
| Data | 24 | 80 | 88 | 124 | 160 |
| Manufacturer Information | Film Type | Film Type | Film Type | Film Type | Film Type |
| Watermark Information | | Water-mark ID | Water-mark ID | Water-mark ID | Water-mark ID |
| Print Information | | | Printing Time/Date Location | Printing Time/Date Location | Printing Time/Date Location |
| Processing | | | | Processing Time/Date Location | Processing Time/Date Location |
| Distribution | | | | | Distribution Time/Date Location |

The information stored in tracking memory 28 can be transferred to database system 100. This can be done by distributor 150, or alternatively this data can be stored in database system 100 as a part of other steps during processing. In still another embodiment, this data can be collected by both tracking memories 28 and database system 100 with a crosscheck being performed at the time of distribution to ensure the integrity of the process. As described above, tracking memory 28 comprises a solid state memory device. However, other memory devices such as optical and magnetic storage devices can be used for tracking memory 28 in like fashion.

Database system 100 such as a database system from ORACLE Corporation, for example, stores the information needed for tracking the processing and distribution at a specific film based upon the detected watermark and for determining who had possession of a film print 134 that has been illegally copied.

Table II shows an illustrated example of a database of this type.

TABLE II

FILM ID NO.
   FILM TYPE
   WATERMARK LOCATION
   WATERMARK ID INFO
   PRINTING INFORMATION LOCATION TIME DATE
   DEVELOPING INFORMATION LOCATION TIME DATE
   DISTRIBUTION INFORMATION LOCATION TIME DATE-SENT TO

In another embodiment, each film print can be assigned with a film ID with the film ID being passed from one tracking memory 28 to another tracking memory 28 during processing. Table II shows the information conveyed by way of the tracking memory.

TABLE III

| Data | 24 | 80 | 88 | 124 | 160 |
|---|---|---|---|---|---|
| FILM ID | FILM ID | FILM ID | FILM ID | FILM ID | FILM ID |

At each stage in the process of the formation and/or distribution of film print 134, the processing equipment provides FILM ID information and other information to database system 100. Database system 100 stores data that can be used for tracking purposes. For example, in this embodiment printing apparatus 112 receives a roll of watermarked print film 74 and determines the FILM ID for this film using, for example, transceiver 92 to obtain data from memory 80. Printing apparatus 112 then provides database system 100 with the FILM ID and information indicating when an image of master copy 32 was recorded onto watermarked print film 74 to form exposed marked film 114. Where useful, printing apparatus 112 can also use the FILM ID to request information regarding print film 134 from database system 100. This data can include information regarding the watermarks recorded on film print 134, or exposure information. In this embodiment, database system 100 organizes information about film print 134 based upon the FILM ID.

Alternatively, the present invention can be performed with no information passing from one tracking memory 28 to another tracking memory 28. This can be done where, at each stage of processing and distribution, a roll of film stored on one reel having a tracking memory comprising for example a REEL ID is moved to another reel having a different and unrelated REEL ID. For example, if the processes described in FIGS. 2 and 4-7, employs a tracking memory 28 such as a RFID transponder, that stores only a transponder identifier, then the data stored in each transponder would appear as shown in table IV.

TABLE IV

| Data | 24 | 80 | 88 | 124 | 160 |
|---|---|---|---|---|---|
| Transponder ID | Transponder ID 1 | Transponder ID 2 | Transponder ID 3 | Transponder ID 4 | Transponder ID 5 |

In such an embodiment, at each stage in the process of forming and distributing film print 134, the processing equipment reads the Transponder ID information from a film supply reel and provides this information and other information to database system 100 as described above. Further, at each stage, the processing equipment reads the Transponder ID from the reel that receives the film and sends this data to database system 100. Database system 100 keeps a record of the sequence of transponders associated with film print 134 as well as all other information provided by the processing and distribution equipment.

For example, in this embodiment printing apparatus 112 receives a reel of watermarked print film 74 and determines the Transponder ID for the reel of watermarked print film 74 using transceiver 90 to obtain the data from memory 80. Printing apparatus 112 then provides database system 100 with the transponder ID and information indicating when an image of print 48 was recorded onto watermarked print film 74 to form exposed marked film 114. Where useful, printing apparatus 112 can also use the transponder ID to request information regarding watermarked print film 74 from database system 100. This data can include information regarding the watermarks recorded on film print 134 or exposure information. In this embodiment, database 100 organizes information about film print 134 based upon the chain of Transponder ID.

By way of example, and not by way of limitation, Table V lists some more detailed examples of the data fields that can be associated with a film strip provided in tracking memory 28 for each media segment on a specific distribution reel 138 as provided to exhibitor 66.

TABLE V

Data Fields

| Field | Description |
| --- | --- |
| Media segment number | Unique identifier for each media segment 240. Encoded alphanumeric string.<br>1:1 correspondence with Watermark ID field.<br>Example: A67G54423K |
| Watermark ID | Unique identifier for watermark pattern. Proprietary code.<br>1:1 correspondence with Media segment number field.<br>Example: 6646637727 |
| Manufacture date | Time stamp for date of media segment manufacture.<br>Example: 020203143406GST |
| Emulsion batch identifier | Unique identifier for film emulsion. Manufacturer data. Example format:<br>emulsion_id-roll#-slit_part#-strip#-perf_unit#<br>Example: 2383-101-011-unit-01-01.1 |
| Print date | Time stamp for date of media segment printing.<br>Example: 021203013140GST |
| Printer number | Identifier for printing apparatus 110. |
| Print vendor code | Unique identifier for third-party film lab.<br>Example: AcmeLabs2331Facility |
| Developer date | Time stamp for date of media segment development.<br>Example: 021403011428GST |
| Developer number | Identifier for developer 120 process or chemical combination used. |
| Distribution date | Time stamp for date of media segment distribution to theater.<br>Example: 022703191709GST |
| Exhibitor ID | Unique identifier for theater or other exhibitor.<br>Example: UK31223ABGTN |

Use of Bar Code Encoding

Figure 8:
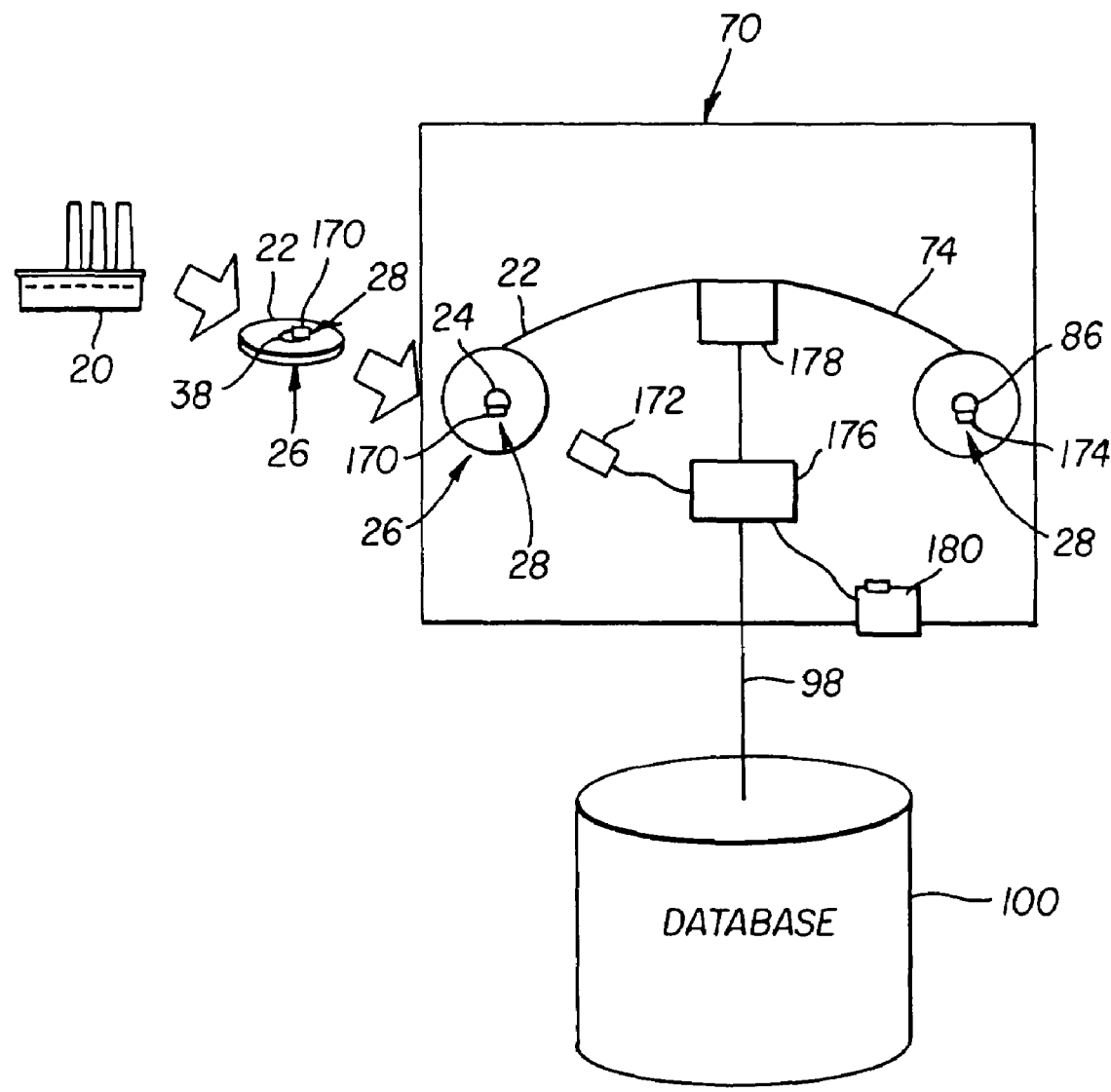
FIG. 8 is a block diagram showing processing of film media in a latent image printer using a bar code reader and bar code writer.

Referring to FIG. 8, there is shown an alternate embodiment of tracking memory 28 comprising a bar code label 170. Bar code label 170 is applied to reel core 56 or to the packaging materials (not shown) such as a wrapping, envelope or other material used to at least partially house un-imaged print film 22. In applying a watermark, bar code reader 172 performs functions similar to these performed by the above-described transponder 92. This includes reading the encoded data for processing by control logic unit 176. A bar code printer 180 then prints out an updated bar code label 174 that is physically coupled to watermarked film 74. Data from the read/write operation is either encoded directly into bar code label 174, so that bar code label 174 itself serves as a tracking memory 28 that stores tracking information, or bar code label 174 provides information for linking to tracking information stored in a database system 100. The barcode printer 180 can print on labels that are to be affixed to a watermarked film 182 or can print directly onto film 182 or film packaging (not shown).

An alternate embodiment uses bar code label 170 or similar encoding in a read-only fashion. When media is processed from one stage to the next, such as in watermark exposure device 72 where un-imaged film 22 on reel core 36 becomes watermarked print film 74, bar code reader 172 simply reads the encoding provided on reel cores 56, or on media packaging. Control logic unit 176 then stores the encoding information or provides that information for tracking memory 28 to a secure networked database system 100. In this embodiment, a second bar code (not shown) can be joined to second core 86 and marking printer 70 can have a second bar code reader to read the second bar code, and to store information about marked film 74 stored on second core 86 in database system 100 to provide the requisite information to permit tracking of the film based upon the watermark.

Other types of data encoding could be used in a similar way to provide tools for automated media production and distribution tracking. For example, magnetically encoded information could alternately be provided, with appropriate magnetically encoded elements physically coupled to the image-recording medium at various production and printing stages and with the necessary readers and, optionally, writers for obtaining data from and writing data to the image-recording medium during the various stages of processing. For example, in one embodiment of this type, tracking memory 28 can comprise a magnetizing strip. In another embodiment of this type, tracking memory 28 can comprise an electronic product code identifier as described in a publication entitled "Auto-ID Center Technology Guide" published by the Auto—ID Center, Massachusetts Institute of Technology, Cambridge, Mass. 02138, USA. This standard provides 64 and 96-bit codes that are written onto labels and products using transponders as described above or using so-called "chipless tags" that encode information in a magnetically readable form such as a printed magnetizable reactive material.

Further, as noted above, certain films are known that have identifying barcode encoded in marginal portions of the film. Such barcode can be used to provide tracking information. For example, such barcode can be used to provide tracking information after development using conventional optical scanners adapted to read such barcode. Further, such barcode can be used prior to photofinishing development where specialized readers are used that can read the exposed barcode without degrading the ability of the film to receive and later present images. For example, infrared readers are known that can be used for this purpose.

Other types of optical encodement devices could be coupled to the film, such as holographic or laser-imprinted tags, for example, with appropriate readers provided.

In one simple embodiment, an operator could be instructed to manually scan an encoded label or even to enter alphanumeric characters to a database system 100 using a keyboard to transcribe this information from a human-readable label. However, it can be appreciated that there are advantages to automated data collection and data entry, such as is provided by RF ID devices, for minimizing errors and providing consistent tracking information.

Security and Interlocks

It is particularly important that a measure of security be provided for tracking information, whether stored using tracking memory 28 or stored on database system 100. Access to stored tracking information should be permitted only after entry of suitable login account names and passwords. Information from database system 100 could be provided in encoded form, readable only to a requester who is in possession of a suitable decoding key, using techniques well known in the information security arts. Write access to database system 100 should be restricted in order to assure the integrity of any information stored in tracking memory 28.

Using the method of the present invention, a system of interlocks can be designed so that, for example, image-recording media is processed within printing apparatus 112 or processor 130 only after accessing and verifying information from tracking memory 28. This could be used to help prevent unauthorized printing or to help prevent printing or processing under the wrong conditions, and/or to provide information that can be used to control the number of film prints 134 made from an original.

In another alternate embodiment, processing and distribution equipment such as printing apparatus 112 and/or processor 130 can be provided with mechanical or electrical interlocks so that these apparatuses do not process any film associated with tracking memory 28 that shows evidence of tampering.

The invention has been described in detail with particular reference to certain preferred embodiments thereof, but it will be understood that variations and modifications can be effected within the spirit and scope of the invention. Among possible modifications are methods used for forming watermarks such as watermark 102 and the sequence for inserting a watermark such as watermark 102 and 104 onto the image-recording medium. Where a watermark is formed using exposure, it may be suitable to provide this marking before, during, or after scene content is recorded into the imageable area of the image-recording medium. Alternately, a watermark can be formed by applying a colorant, such as an ink or dye. This allows watermarks 102 and 104 to be formed on the print after scene content is recorded and even after development of the print. Watermarks such as watermarks 102 and 104 can also be inserted by using digital mastering techniques to combine scene images and watermarks electronically and exposing the electronically combined image and watermark on the film.

Further, it will also be appreciated that while the above embodiments have been described with reference to an image-recording medium comprising a print film the methods described herein are equally applicable to other forms of image-recording mediums such as analog and digital video tapes, disks, and other forms of electronic and optical image-recording mediums.

Thus, what is provided is a method and apparatus for tracking the processing and distribution of image-recording media.

PARTS LIST 20 media manufacturer
22 un-imaged print film
24 core
26 un-imaged print film rolls
28 tracking memory
30 studio
32 master copy
34 printing lab
36 printing apparatus
38 exposure head
42 source reel
44 take-up reel
46 exposed print film
48 imaged print film reel
50 film processor
52 baths
52a developer bath
52b bleach bath
52c fixer bath
54 developed print film
56 reel core
58 film reels
60 reel sides
64 film exchange
66 exhibitors
70 marking printer
72 watermark exposure device
74 watermarked print film
74'a residual quantity of watermarked print film
80 memory
82 data storage system
84 communication system
85 antenna
86 second core
88 second memory
90 control logic unit
92 transceiver
93 transceiver
94 RF signals
96 RF signals
98 network connection
100 database system
102 watermark
104 watermark
108 segment
110 segment
111 printing head
112 printing apparatus
114 exposed marked film
116 exposed film core
118 exposed film roll
120 printer control logic unit
122 printer transceiver
124 exposed film memory
128 network connection
130 processor
132 baths
132a developer baths
132b bleach bath
132c fixer bath
134 film print
136 distribution core
138 distribution reel
140 processor control logic unit
142 transceiver
144 distribution memory
146 RF signals
148 RF signals
149 processor network connection
150 film exchange distributor
152 transceiver
154 control logic unit
156 RF signals
158 network connection
160 exhibitor
162 exhibitor
170 barcode
172 bar code reader
174 bar code label
176 control logic unit
180 bar code printer
182 film

What is claimed is:

1. A method for distributing an image-recording medium, the method comprising the steps of:
   (a) encoding an identifying mark within a recorded image area on the image-recording medium;
   (b) associating a tracking memory having tracking information with the image-recording medium with the tracking memory having tracking information stored therein;
   (c) distributing the image-recording medium to users of the image-recording medium; and,
   (d) reading the tracking information from the tracking memory and storing the tracking information in a database that associates the users to whom the image-recording medium has been distributed with the identifying mark recorded in the image area.

2. The method of claim 1 wherein the step of encoding said identifying mark comprises the step of steganographically encoding information content in a form that is not readily perceptible to an unaided human viewer.

3. The method of claim 1 wherein the step of associating tracking information with said tracking memory comprises associating a radio frequency transponder with the image-recording medium.

4. The method of claim 3, wherein said image-recording medium comprises a photographic film stored on a film core and wherein the step of associating a radio frequency transponder comprises the step of attaching said radio frequency transponder having tracking information stored therein to the film core.

5. The method of claim 3, wherein said image-recording medium comprises a photographic film stored on a film core and wherein the step of associating a radio frequency transponder comprises transferring the photographic film to a film core having a radio frequency transponder with tracking information stored therein.

6. The method of claim 3, wherein the image-recording medium is stored in packaging during distribution and wherein the tracking memory is joined to the packaging.

7. The method of claim 1, wherein the step of associating tracking information with the recording medium comprises the step of physically associating a label having markings thereon to the image-recording medium, said markings being representative of the tracking information.

8. The method of claim 7, wherein the markings are in human readable form.

9. The method of claim 7 wherein the markings are in machine readable form.

10. The method of claim 1 wherein the step of associating tracking information with the image-recording medium comprises the step of associating a magnetic strip having electromagnetically encoded tracking information recorded thereon.

11. The method of claim 1 wherein the step of associating said tracking information with the image-recording medium comprises the step of associating an external data storage device with the image-recording medium.

12. The method of claim 1 further comprising the steps of detecting an identifying mark contained on a copy of an image contained within a recorded image area on the image-recording medium, accessing the database and determining therefrom the users to whom the image-recording medium containing the identifying mark was distributed.

13. The method of claim 1, wherein the step of encoding an identifying mark comprises the step of exposing a latent image onto the image-recording medium.

14. The method of claim 1 wherein the step of encoding an identifying mark comprises encoding more than one identifying mark on the image-recording medium.

15. The method of claim 14, wherein the image-recording medium has more than one segment with each segment having a different identifying mark and wherein each different identifying mark is associated with tracking information so that the tracking information can be determined from any of the identifying marks.

16. The method to claim further comprising the step of associating a second memory with the image-recording medium comprises physically coupling said second memory to the image-recording medium and emitting an electromagnetic signal having tracking information therein, said tracking information being received by the second memory and stored therein.

17. A method for distributing an image-recording medium, the method comprising the steps of:
   encoding an identifying mark into an image bearing segment of an image-recording medium to form a marked image-recording medium;
   storing the marked image-recording medium using a first packaging having a first memory;
   storing tracking data in the first memory from which the identifying mark on the image bearing segment of the marked image bearing recording medium can be used to determine information about the distribution of the marked image-recording medium,
   recording an image onto the marked image-recording medium, to form an image-recording medium;
   storing the image-recording medium using second packaging having a second memory;
   reading tracking data from said first memory;
   storing information in the second memory from which the markings on the imaged recording medium can be used to determine information about the distribution of the marked image-recording medium.

18. The method of claim 17, further comprising the steps of:
   developing said imaged image-recording medium to form a printed imaged recording medium; and,
   storing the printed imaged recording medium on a third packaging having a third memory;
   reading data from said second memory; and
   storing information from which the markings on the imaged recording medium can be used to determine information about the distribution of the imaged recording medium.

19. The method of claim 18, further comprising the steps of:
   distributing said printed image-recording medium to an exhibitor;
   reading tracking information from the third memory; and
   using the tracking information to store information from which the markings on the imaged recording medium can be used to determine information about the distribution of the imaged recording medium.

20. The method of claim 17 wherein the step of encoding said identifying mark comprises the step of exposing a watermark pattern onto a portion of said image-recording medium.

21. The method of claim 17 wherein the step of storing the marked image-recording medium using a first packaging having a first memory comprises storing the marked image-recording medium using a wrapping and associating a transponder with the wrapping.

22. The method of claim 17 wherein the step of storing the marked image-recording medium using a first packaging having a first memory comprises the steps of storing the image-recording medium on a reel and associating a transponder with the reel.

23. The method of claim 17 wherein the step of storing the marked image-recording medium using a first packaging having a first memory comprises the steps of storing the marked image-recording medium on a core and associating a transponder with the core.

24. The method of claim 17 wherein the step of encoding said identifying mark comprises the step of forming steganographically encoded image data.

25. The method of claim 17 wherein the tracking information is stored in a server computer.

26. The method of claim 25 wherein said server manages a database.

27. The method of claim 17 wherein said identifying mark comprises a multi-bit identifier.

28. The method of claim 17 wherein the image-recording medium is a photosensitive medium.

29. The method of claim 17 wherein the step of encoding said identifying mark comprises the step of forming a latent image onto the image-recording medium.

30. The method of claim 17 wherein the step of coupling said first memory to said unmarked image segment comprises the step of affixing a bar code label.

31. The method of claim 17 wherein the step of coupling said first memory to said unmarked image segment comprises the step of scanning an optical encoding.

32. The method of claim 17 wherein the step of coupling said first memory to said unmarked image segment comprises the step of scanning a magnetic encoding.

33. A method for tracing the source of an illegal copy of a motion picture, the method comprising the steps of:
(a) encoding an identifying mark onto a segment of an image-recording medium to form a marked segment of said image-recording medium, said identifying mark associated with a data location in a memory, said memory coupled to said marked segment of said image-recording medium, said data location comprising data identifying said marked segment;
(b) extracting said identifying mark from said marked segment of the illegal copy;
(c) decoding said encoded identifying mark to obtain said data location; and
(d) accessing said memory to obtain data stored at said data location.

34. An image-recording medium comprising:
(a) a segment of an image receiving surface having an identifying mark encoded thereon; and
(b) a tracking memory coupled to the medium, said memory having data stored thereon corresponding to said identifying mark.

35. An image-recording medium according to claim 34 wherein said identifying mark comprises a steganographic encoding.

36. An image-recording medium according to claim 34 wherein a radio frequency transponder comprises said memory.

37. An image-recording medium according to claim 34 wherein said memory is optically encoded.

38. An image-recording medium according to claim 34 wherein said memory is magnetically encoded.

39. An image-recording medium according to claim 34 wherein said memory is affixed to a film core.

40. An image-recording medium according to claim 34 wherein said memory is affixed to a film reel.

41. An image-recording medium according to claim 34 wherein the image-recording medium is photosensitive.

* * * * *